No. 829,088. PATENTED AUG. 21, 1906.
G. W. RIDDLE.
HORSE RELEASER.
APPLICATION FILED DEC. 4, 1905.

2 SHEETS—SHEET 1.

Witnesses
J. C. Simpson
J. C. Jones

Inventor
G. W. Riddle
By Chandler & Chandler
Attorneys

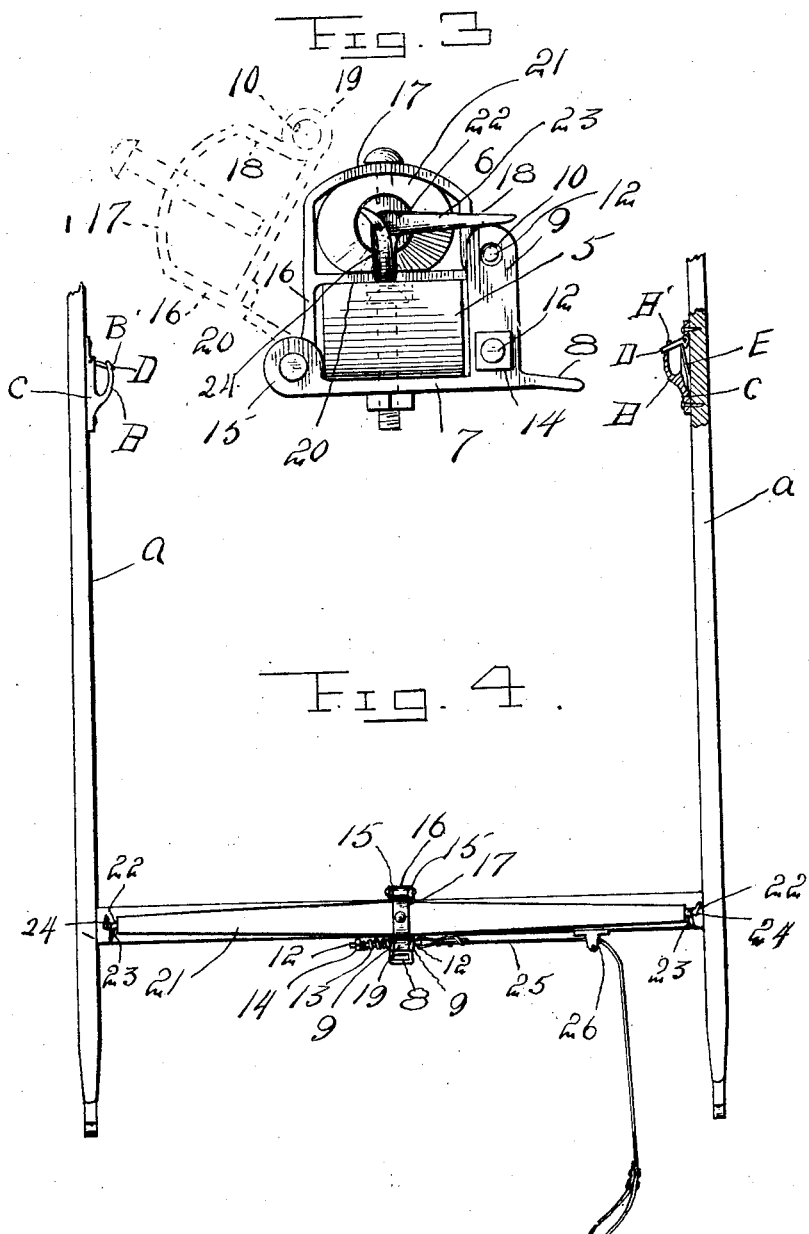

UNITED STATES PATENT OFFICE.

GEORGE W. RIDDLE, OF BRECKENRIDGE, MISSOURI, ASSIGNOR OF ONE-HALF TO PATRICK SCANLON, OF BRECKENRIDGE, MISSOURI.

HORSE-RELEASER.

No. 829,088.     Specification of Letters Patent.     Patented Aug. 21, 1906.

Application filed December 4, 1905. Serial No. 290,322.

*To all whom it may concern:*

Be it known that I, GEORGE W. RIDDLE, a citizen of the United States, residing at Breckenridge, in the county of Caldwell, State of Missouri, have invented certain new and useful Improvements in Horse-Releasers; and I do hereby declare the following to be a full, clear, and exact description of the invention, such as will enable others skilled in the art to which it appertains to make and use the same.

This invention relates to horse-releasers, and has for its object to provide means for releasing a horse from a vehicle which will be simple and which may be easily and quickly operated.

Another object is to provide a releaser which will eliminate expensive and complicated trace-hooks.

Other objects and advantages will be apparent from the following specification.

Figure 1:
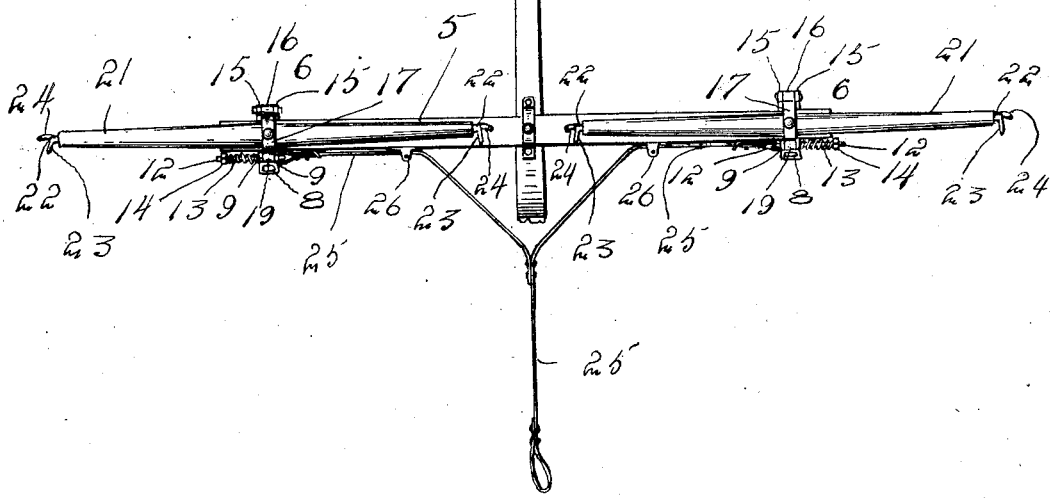
Figure 2:
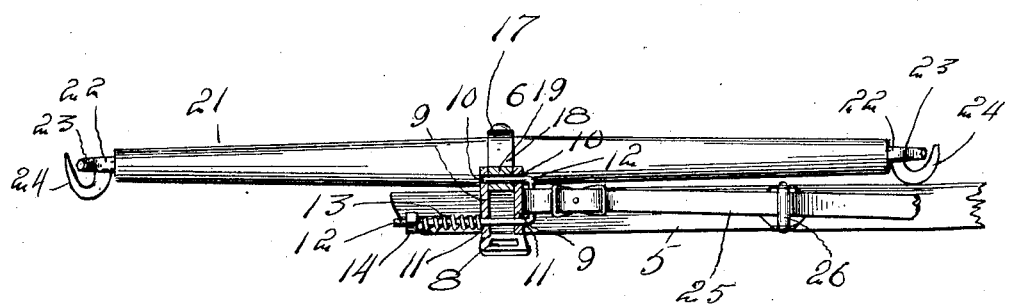

In the drawings forming a portion of this specification, and in which like characters of reference indicate similar parts in the several views, Figure 1 is a top plan view. Fig. 2 is a rear elevation, partly in section. Fig. 3 is an end view of the whiffletree and doubletree with the latter in operative relation and showing it in releasing position in dotted lines. Fig. 4 is a top plan of the present releaser, including a pair of shafts and holdback-hooks, the releaser being adapted for a one-horse vehicle.

Referring now to the drawings, and more particularly to the first three figures thereof, there is shown a whiffletree 5, to each end of which is attached a releasing device 6. Each of these devices consists of a plate 7, secured to the under face of the whiffletree and extending forwardly and rearwardly therebeyond. Rearwardly of the whiffletree the plate has an opening 8 therethrough for the reception of a chain or other tie to limit the movement of the whiffletree. Between the eye and the whiffletree the plate has a pair of wings 9 extending upwardly therefrom at its opposite side, and formed through these wings there are upper and lower pairs of alining openings 10 and 11, respectively. A bar 12 is passed through the lower pair of openings and has its inner portion turned upwardly and then outwardly and engaged in the upper pair of openings, the lower portion of the bar being slidable in the openings 11 to bring the upper portions thereof into and out of the openings 10, and a helical spring 13 is engaged with the lower portion of the bar and rests against the outer wing 9 and against a nut 14, adjustably engaged with the free end of the lower portion of the bar to vary the connection of the spring. The spring thus holds the bar with its upper portion in the openings 10 and yieldably against movement out of such position. The forward end of the plate 7 has a pair of upwardly-extending ears 15, between which there is pivoted one leg 16 of a yoke 17, which extends rearwardly over the whiffletree, the other leg 18 of the yoke carrying an eye 19, which lies normally in registration with the opening 10 between the ears 9 and with the upper portion of the bar 12 engaged therein to hold the yoke against pivotal movement between the ears 15. The yoke lies with its bight in spaced relation to the whiffletree and thereabove, as shown, and a web 20 extends from the leg 16 to the leg 18 and rests normally upon the whiffletree, and a swingletree 21 is pivoted between the web and the bight of each of the releasing devices 6. The swingletrees 21 carry at their ends trace-receiving hooks 22, which when the swingletrees are in operative position lie in position to receive and hold the traces. These hooks each include a rearwardly-extending finger 23 and a second finger 24, which is bent downwardly, then upwardly, then outwardly, and lies with its free end portions in spaced relation to the finger 23. In use the eyes of the traces are engaged with the rearwardly-extending fingers 23 and lie within the inclosures of the fingers 24. Straps 25 are connected with the upwardly-extending portions of the bars 12 and are engaged with guide-pulleys 26, mounted upon the whiffletree, and these straps may be pulled to release the yokes 17, when the stress on the swingletrees will move the yokes pivotally and forwardly, when the fingers 23 will be brought into position to extend forwardly and permit the traces to slip therefrom, the movement of the swingletrees at the same time disengaging the fingers 24 from the traces.

In Fig. 4 there is shown a form of the present invention adapted for use in a one-horse vehicle, the releasing devices being the same as those already described. The shafts A of the vehicle are provided with inwardly-extending forwardly-directed hooked fingers B, which are carried by attaching-plates C, the free ends of these hooked fingers being bifurcated, as shown at B', for the reception of a latch D, which are pivoted to the attaching-plates C. Springs E are provided to hold the latches yieldably in operative position and against forward movement. In use the holdback-straps are engaged with the fingers B, and when the releasing operation is performed and the horse passes from between the shafts the holdback-straps are brought into engagement with the latches D to move them into inoperative position and release the straps.

What is claimed is—

A horse-releaser comprising a support, a plate secured beneath the support and extending forwardly and rearwardly therebeyond, upwardly-extending wings carried by the plate rearwardly of the support and having a pair of registering openings therein, a yoke pivoted at the lower end of one leg to the forward end of the plate for forward and rearward movement in a vertical plane, said yoke extending forwardly and rearwardly over the support, an eye carried by the yoke and lying between the wings in registration with the openings thereof, a bar movable into and out of the registering openings and eye to hold the yoke against forward movement, means for holding the bar yieldably in operative position, a swingletree pivoted in the yoke for horizontal movement, and rearwardly extending trace-receiving fingers carried by the swingletree.

In testimony whereof I affix my signature in presence of two witnesses.

GEORGE W. RIDDLE.

Witnesses:
O. J. CHAPMAN,
NORA A. HALE.